(12) United States Patent
Lin et al.

(10) Patent No.: US 7,169,436 B2
(45) Date of Patent: Jan. 30, 2007

(54) EMULSIFIER SYSTEMS FOR USE IN MAKING DEHYDRATED STARCH INGREDIENTS

(75) Inventors: Peter Yau Tak Lin, Liberty, OH (US); David Cammiade Gruber, Cincinnati, OH (US); Maria Dolores Martinez-Serna Villagran, Mason, OH (US); Paul Seiden, Cincinnati, OH (US)

(73) Assignee: The Procter and Gamble Company

( * ) Notice: Subject to any disclaimer, the term of this patent is extended or adjusted under 35 U.S.C. 154(b) by 436 days.

(21) Appl. No.: 09/965,113

(22) Filed: Sep. 26, 2001

(65) Prior Publication Data
US 2002/0061354 A1  May 23, 2002

Related U.S. Application Data

(60) Provisional application No. 60/235,291, filed on Sep. 26, 2000, provisional application No. 60/235,290, filed on Sep. 26, 2000, provisional application No. 60/235,449, filed on Sep. 26, 2000, provisional application No. 60/235,298, filed on Sep. 26, 2000, provisional application No. 60/235,289, filed on Sep. 26, 2000.

(51) Int. Cl.
*A23L 1/035* (2006.01)

(52) U.S. Cl. ............... 426/654; 426/602; 426/653

(58) Field of Classification Search ............ 426/605, 426/654, 808, 653, 602
See application file for complete search history.

(56) References Cited

U.S. PATENT DOCUMENTS

| | | | |
|---|---|---|---|
| 2,490,431 A | 12/1949 | Greene et al. | |
| 2,661,349 A | 12/1953 | Caldwell et al. | |
| 2,759,832 A | 8/1956 | Cording et al. | |
| 2,780,552 A | 2/1957 | Willard, Jr. et al. | |
| 2,787,533 A | 4/1957 | O'Neill, Jr. et al. | |
| 2,962,419 A | 11/1960 | Minich | |
| 3,009,817 A | 11/1961 | Hendel et al. | |
| 3,085,020 A | 4/1963 | Backinger et al. | |
| 3,455,838 A | 7/1969 | Marotta et al. | |
| 3,579,548 A | 5/1971 | Whyte et al. | |
| 3,626,466 A | 12/1971 | Liepa et al. | |
| 3,917,866 A | 11/1975 | Purves et al. | |
| 3,932,532 A | 1/1976 | Hunter et al. | |
| 3,968,260 A | 7/1976 | Shatila et al. | |
| 3,987,210 A | 10/1976 | Cremer | |
| 3,998,975 A | 12/1976 | Liepa | |
| 4,005,195 A | 1/1977 | Jandacek | |
| 4,005,196 A | 1/1977 | Jandacek et al. | |
| 4,241,094 A | 12/1980 | O'Neil et al. | |
| 4,338,346 A | 7/1982 | Brand | |
| 4,399,163 A | 8/1983 | Brennan et al. | |
| 4,411,925 A | 10/1983 | Brennan et al. | |
| 4,423,029 A | 12/1983 | Rizzi | |
| 4,460,617 A | 7/1984 | Barndt et al. | |
| 4,508,746 A | 4/1985 | Hamm | |
| 4,582,715 A | 4/1986 | Volpenhein | |
| 4,582,927 A | 4/1986 | Fulcher | |
| 4,680,184 A * | 7/1987 | Seiden et al. | 426/654 |
| 4,705,691 A | 11/1987 | Kupper et al. | |
| 4,832,975 A | 5/1989 | Yang | |
| 4,840,815 A | 6/1989 | Meyer et al. | |
| 4,861,613 A | 8/1989 | White et al. | |
| 4,888,195 A | 12/1989 | Huhn et al. | |
| 4,959,466 A | 9/1990 | White | |
| 5,059,443 A | 10/1991 | Ennis et al. | |
| 5,077,073 A | 12/1991 | Ennis et al. | |
| 5,085,844 A | 2/1992 | Nowack et al. | |
| 5,237,772 A | 8/1993 | Gibbs | |
| 5,288,512 A | 2/1994 | Seiden | |
| 5,308,634 A | 5/1994 | Cooper | |
| 5,374,446 A | 12/1994 | Ferenz et al. | |
| 5,389,392 A | 2/1995 | Cooper | |
| 5,399,371 A | 3/1995 | Harris | |
| 5,399,729 A | 3/1995 | Cooper et al. | |
| 5,419,925 A | 5/1995 | Seiden et al. | |
| 5,427,815 A | 6/1995 | Ferenz | |
| 5,451,416 A | 9/1995 | Johnston et al. | |
| 5,464,642 A | 11/1995 | Villagran et al. | |
| 5,465,643 A | 11/1995 | Beeson | |
| 5,480,667 A | 1/1996 | Corrigan et al. | |

(Continued)

FOREIGN PATENT DOCUMENTS

EP   0 168 112   1/1986

(Continued)

OTHER PUBLICATIONS

Talburt, W. & Smith, O.; "Potato Processing"; Fourth Edition, Van Nostrand Reinhold Company, Inc., 1987; pp. 565-600.

(Continued)

*Primary Examiner*—Lien Tran
(74) *Attorney, Agent, or Firm*—Steven Robert Chuey; Carl J. Roof (57) ABSTRACT

Described is an improved emulsifier system containing polyglycerol ester, monoglyceride and lecithin suitable for use in making dehydrated starch ingredients. Also disclosed are a process for making the dehydrated ingredients using the improved emulsifier systems, doughs made using the dehydrated ingredients and the process for making those doughs, and food products containing the dehydrated ingredients.

11 Claims, 2 Drawing Sheets

U.S. PATENT DOCUMENTS

| | | |
|---|---|---|
| 5,490,995 A | 2/1996 | Corrigan |
| 5,589,217 A | 12/1996 | Mazurek |
| 5,597,605 A | 1/1997 | Mazurek |
| 5,925,396 A | 7/1999 | Reed et al. |
| 5,928,700 A | 7/1999 | Zimmerman et al. |
| 6,066,353 A | 5/2000 | Villagran et al. |
| 6,242,499 B1 * | 6/2001 | Gruning et al. ............. 514/785 |
| 6,287,622 B1 | 9/2001 | Villagran et al. |

FOREIGN PATENT DOCUMENTS

| | | |
|---|---|---|
| WO | WO 06/01572 | 1/1996 |
| WO | WO 99/03362 | 1/1999 |
| WO | WO 99/20125 | 4/1999 |

OTHER PUBLICATIONS

Chester, T.L. & Innis, D.P.; "Journal of High Resolution Chromatography and Chromatography Communications"; 9$^{th}$ Edition; 1986, pp. 170-181.

Rosevear, F.B.; "Journal of the Society of Cosmetic Chemists"; 19$^{th}$ Volume, pp. 581-594; Aug. 19, 1968.

Krog, N.; "Food Emulsions"; Stig Friberg & Kare Larsson, 1997 Marcel Dekker, New York; pp. 141-185.

Olesen, Susanne K. and Krog, Niels; "Phase Behaviour of New Food Emulsifiers and Their Application"; Reprinted from Oils And Fats In Food Applications, ISBN 0-9531949-0-6 Publisher PJ Barnes & Associates; Nov. 1997.

* cited by examiner

EMULSIFIER SYSTEMS FOR USE IN MAKING DEHYDRATED STARCH INGREDIENTS

CROSS REFERENCE TO RELATED APPLICATIONS

This application claims priority to U.S. Provisional Application No. 60/235,291, U.S. Provisional Application No. 60/235,290, U.S. Provisional Application No. 60/235,449, U.S. Provisional Application No. 60/235,298 and U.S. Provisional Application No. 60/235,289, all of which were filed Sep. 26, 2000.

FIELD OF THE INVENTION

The present invention relates to an improved emulsifier system for use in making dehydrated starch ingredients. Such dehydrated starch ingredients are used in the formulation and manufacture of farinaceous food products, including those products made from potatoes, wheat, corn, rice, and tapioca. The dehydrated starch ingredients made using the emulsifier system of the present invention are particularly useful in making other food products made from dehydrated starch ingredients including, but not limited to, dehydrated mashed potatoes.

BACKGROUND OF THE INVENTION

Many processes and compositions are known in the art for making food products derived from dehydrated starch ingredients. Although processing of these products has been carried out for years, problems are still encountered in reproducing, within a narrow (and predictable) range, product textures, flavors and expansion ratios that ensure the manufacture of products having consistent quality. Many farinaceous snack products are made from "half-products." Problems associated with the expansion properties of half-products—e.g., the amount of oil absorbed during expansion when frying the half-products and the texture and flavor of the finished snacks—have placed added importance on developing dough formulas that can be used to produce expanded snacks which are lower in oil and have improved textures and flavors relative to conventional expanded snacks.

Farinaceous products comprising dehydrated fruits, grains and vegetables, and in particular potatoes, have become extremely popular. Among the most popular products are fabricated potato chips, tortilla chips, pretzels and extruded or puffed products. Farinaceous products are generally made by combining water, flavorings, emulsifiers and other materials with dehydrated starch ingredients. The mixture is then typically extruded and/or sheeted and cooked (e.g., via baking or frying) to form the final product. Control over the taste and other organoleptic properties of the finished product is largely dependent on the physicochemical and organoleptic properties of the starting dehydrated ingredient(s).

By utilizing the improved emulsifier system of the present invention, manufacturers and producers of raw material ingredients for starch-based farinaceous snacks can increase production rate, decrease production costs, or both. When raw material suppliers can offer better raw materials to formulators and manufacturers of various farinaceous food products, the formulators and manufacturers may be in substantially better control of the microstructure, resulting in improvements in flavor display, appearance, texture, and/or eating quality of the resulting formulated food.

Additionally, utilization of the improved emulsifier system of the present invention can minimize changes in product aging (i.e., staling). Further, the emulsifier system may reduce the oil content of the fried or baked fabricated farinaceous snack.

The improved emulsifying system of the present invention further provides increased flexibility in the process of formulating snacks using rice, wheat, corn and potato (e.g., granules, flakes or other dehydrated potato forms) ingredients. This leads to potential cost reduction, flavor improvement or both. Further, with the improved emulsifier system of the present invention it is possible to formulate various products (baked as well as fried) that exhibit a range of microstructures and textures.

Also important in the fabricated farinaceous foods industry is the cost and speed of the manufacturing process. The improved emulsifier system of the present invention provides process control optimization that allows the maximization of line speed control to be formulated and manufactured (e.g. tailored microstructure).

The emulsifier system also provides farinaceous food products which exhibit improved dough antisticking properties; these anti-stick properties are important to aid in formulation, processing and manufacturing flexibility, and are particularly important in the manufacture of embossed snacks such as, for example, Pringles Ridges®. Additionally, these anti-stick properties are important in relatively "weak" doughs (e.g., reduced sheet strength) such as doughs used for crackers and tortillas.

The improved emulsifier system of the present invention can be used to reduce the level of emulsifier needed in the dehydration process. In particular, it reduces the level of the emulsifier(s) needed as a processing aid in the drum drying operation. This reduces the cost of raw materials, as well as the potential for formation of off-flavors due to oxidation. In addition, the improved emulsifier system of the present invention may reduce potato cell breakage in the drum drying operation, which results in higher levels of flavor precursors. This results in farinaceous food products of improved flavor.

For a fat-free snack such those fried in olestra, the level of emulsifiers in the dehydrated starch ingredients may be decreased. This allows the formulator to increase the level of other sources of triglycerides and still provide the reduced level of fat in the finished product necessary in most territories to make the fat-free claim.

Further, the improved emulsifier system of the present invention may reduce the agglomeration issues of potato cells during fluidization and spray drying in the manufacturing of granules.

SUMMARY OF THE INVENTION

In one aspect, the present invention is directed to an improved emulsifier system for making dehydrated starch ingredients, wherein the emulsifier system comprises an emulsifier selected from the group consisting of (i) a polyglycerol ester having a polyglycerol backbone comprising from 2 to about 10 glycerol units, wherein not more than about 40% of the hydroxyl groups are esterified with fatty acid moieties (as discussed below, these esters are referred to herein generally as "polyglycerol esters" or "PGEs"), (ii) a DATEM, and (iii) mixtures thereof.

In another aspect, the present invention is directed to a process for making dehydrated starch ingredients. In one particular embodiment, the process is directed to the production of dehydrated potato ingredients. The process comprises the steps of:
(a) cooking potato pieces;
(b) forming the cooked potato pieces into a potato mash;
(c) drying the potato mash to provide dehydrated potato ingredients;
(d) optionally comminuting the dehydrated mash; and
(e) adding an emulsifier system anytime prior to formation of the dehydrated potato ingredients in step (c); wherein the emulsifier system comprises an emulsifier selected from the group consisting of (i) a polyglycerol ester having a polyglycerol backbone of from 2 to about 10 glycerol units wherein not more than about 40% of the hydroxyl groups of the polyglycerol ester are esterified with fatty acids (PGE), (ii) a DATEM, and (iii) mixtures thereof.

In another aspect, the invention relates to dehydrated potato ingredients comprising an emulsifier selected from the group consisting of (i) a PGE, (ii) a DATEM, and (iii) mixtures thereof.

In still another aspect, the invention relates to a dough composition comprising:
(a) from about 35% to about 85% of a starch-based flour comprising a dehydrated starch ingredient comprising an emulsifier selected from the group consisting of (i) a PGE, (ii) a DATEM, and (iii) mixtures thereof;
(b) from about 15% to about 50% added water; and
(c) optionally a dough emulsifier.

In still another aspect, the invention relates to a food product comprising these dehydrated starch ingredients.

In yet another aspect, the invention relates to an improved emulsifier system useful in making dehydrated starch ingredients, wherein the emulsifier system exists as a stable dispersion at a temperature of at least about 80° C. Applicants have found that emulsifier systems exhibiting these properties (including certain of the PGE and DATEM containing systems described above) provide several benefits over existing emulsifier systems. In this regard, the invention further relates to a process for making dehydrated starch ingredients as described above, wherein the emulsifier system exists as a stable dispersion at a temperature of at least about 80° C. Further, the invention relates to dehydrated starch ingredients comprising an emulsifier(s) that exists as a stable dispersion at a temperature of at least about 80° C., doughs made using those ingredients and to a food product comprising the ingredients.

DETAILED DESCRIPTION OF THE INVENTION

I. Definitions

As used herein, the term "added water" refers to water that has been added to the composition being discussed. Thus, for example, water that is inherently present in the dry dough ingredients, such as in the case of the sources of flour and starches, is not included in the term added water.

The term "alpha-stable" or "α-stable" means a material such as an emulsifier having the ability to remain in the a polymorph. It is common for emulsifiers to transition from α to β' and subsequently to the β polymorph. Alpha-stable emulsifiers are desirable herein because of their higher emulsification functionality.

The term "comprising" means various components and processing steps can be conjointly employed in practicing the present invention. Accordingly, the term "comprising" encompasses the more restrictive terms "consisting essentially of" and "consisting of."

The abbreviation "cps" means centipoise.

The terms "dehydrated starch ingredient" and "dehydrated starch raw materials" are used interchangeably and refer to dehydrated potato products (flakes, flanules, granules, slivers, nubbins, powder, flour, particles, pieces); dehydrated wheat product (flakes, flanules, granules, slivers, nubbins, powder, flour, particles, pieces); dehydrated rice products (flakes, flanules, granules, slivers, nubbins, powder, flour, particles, pieces); dehydrated corn products (flakes, flanules, granules, slivers, nubbins, powder, flour, particles, pieces); and dehydrated tapioca products (flakes, flanules, granules, slivers, nubbins, powder, flour, particles, pieces).

The terms "diacetylated tartaric acid esters of monoglycerides" and "DATEM" each refer to the mixture of products resulting from the reaction of diacetylated tartaric acid anhydride with monoglycerides. This reaction forms a complex mixture of various components, the most prevalent being diacetyl tartaric acid esters of monoglycerides (DATEM I), di-(diacetyl tartaric acid) esters of monoglycerides (DATEM II), diacetyl tartaric acid esters of diglycerides (DATEM III) and monoacetyl mono (diacetyl tartaric acid) esters of monoglycerides (DATEM IV). See Danisco Ingredients Technical Paper TP2-1e, available from Danisco Cultor (New Century, Kans.)

The term "diglycerol monoesters" and "DGME" each refers to a preferred type of polyglycerol monoester for use in the present invention. DGMEs are polymers of two glycerol units having one fatty acid esterified on the diglycerol backbone. Particularly preferred diglycerols are those esterified with palmitic, oleic, or stearic fatty acids, or a mixture of intermediate melting fatty acids.

The term "di-triglycerol monoesters" refers to a preferred polyglycerol monoester mixture comprising predominantly DGME and triglycerol monoesters.

The term "dispersion" refers to an emulsifier system that exists as a colloidal system in water. These systems include dilute lamellar liquid crystal, hexagonal, crystalline and mixed crystalline phases. The term "stable dispersion" refers to a dispersion that exists for at least 5 minutes at the temperature in question. The method for determining whether an emulsifier system exists as a stable dispersion is described in the Analytical Methods section.

The term "dough emulsifier" means an emulsifier or emulsifiers that are added during the dough making process in addition to the emulsifier(s) present in the dehydrated starch ingredients utilized.

The term "extrudate" means wet dough pieces immediately exiting an extruder.

The terms "farinaceous food" and "farinaceous food product" are used interchangeably and refer to fabricated crisps, tortillas, wheat thins, crackers (creamed and sandwiches) soft tortillas, rice cakes, cereals, extruded snacks, granola bars, Newton's, etc. Said farinaceous food products may be sweet, salty, or savory.

The terms "fat" and "oil" are used interchangeably unless otherwise specified. The terms include edible fatty substances in a general sense, including but not limited to digestible and non-digestible fats, oils, and fat substitutes.

The term "finished product," when used in the context of farinaceous food products, refers to a consumable product that has been finished (e.g., baked; fried; baked, then fried; or fried, then baked) to produce a ready-to-eat product.

The term "flour blend" refers to a mixture of all dough ingredients, excluding the water. The "flour blend" includes all dry ingredients, as well as any other ingredients such as liquid emulsifier.

The term "half-product" refers to intermediate moisture snack pieces capable of being expanded in volume individually upon frying. The term includes pellets, collets and expandable pieces of complex shapes, e.g., shells, letters, numbers, symbols, animals, flowers, spirals, twists, cones, faces, tubes, fries and stars.

The terms "intermediate melting" and "IM" each mean esters formed from a mixture of fatty acids that are liquid and fatty acids that are solid at room temperature. Examples of fatty acid mixtures include, for example, mixtures of palmitic, oleic, linoleic, linolenic, stearic and other $C_{18}$ trans fatty acids. Partial hydrogenation is one way to produce IM fatty acid esters.

The term "lecithin" includes conventional acetylated lecithins, hydroxylated lecithins, hydrogenated and partially hydrogenated lecithins and other suitable lecithin or lecithin-like compounds such as de-oiled lecithin, lysolecithins, egg lecithins, egg yolk powder, phosphotidyl choline enriched lecithin, phosphatidic acid and its salts, lysophosphatidic acid and its salts, and phospholated monoglycerides and any mixture thereof. Also suitable are lecithins blended with other emulsifiers, e.g., Centromix®E from Central Soya, Ft. Wayne, Ind., which is a blend of lecithin and Tween.

The term "mesh" means the number of apertures per square inch of a screen or sieve. In other words, mesh is the square of the number of strands of metal or plastic per linear inch. All references to mesh size herein refer to US Standard Sieve Series.

The term "modified starch" refers to starch that has been physically or chemically altered to improve its functional characteristics. Suitable modified starches include, but are not limited to, pregelatinized starches, low viscosity starches (e.g., dextrins, acid-modified starches, oxidized starches, enzyme modified starches), stabilized starches (e.g., starch esters, starch ethers), cross-linked starches, starch sugars (e.g. glucose syrup, dextrose, isoglucose) and starches that have received a combination of treatments (e.g., cross-linking and gelatinization) and mixtures thereof.

The term "moisture" means the total amount of water present in the material being discussed. With respect to doughs, "moisture" includes the water inherently present as well as any water that is added to the dough ingredients.

The term "monoglyceride" refers to a mixture of glycerides (mono-, di-, and triglycerides) where at least 80% of the glycerol backbones are esterified with one fatty acid. Monoglyceride can be made by the reaction of glycerin with triglyceride (i.e., glycerolysis) to produce mono-, di- and triglycerides. The desired monoglyceride content is typically achieved by molecular distillation of the above described reaction mixture. Alternatively, monoglyceride can be made by an enzymatic process.

The term "mono-diglyceride" refers to a mixture of glycerides where from about 30% to about 60% of the glycerol backbones are esterified with one fatty acid. Mono-diglyceride can be made by the reaction of glycerine with triglyceride (i.e., glycerolysis) to produce mono-, di- and triglycerides.

The term "nubbins" refers to short or broken potato pieces that are separated from the potato after it is cut into French fry strips. These pieces are generally the by-products from the end portions of the French fry strip.

The terms "polyglycerol ester" and "PGE" are used interchangeably and each mean a polyglycerol ester having a polyglycerol backbone comprising from 2 to about 10 glycerol units, wherein not more than about 40% of the hydroxyl groups of the polyglycerol ester are esterified with fatty acids. For the sake of brevity, Applicants will use the following shorthand nomenclature to refer to PGEs:

No. of glycerol units–No. of esterified groups–Abbr. of the fatty acid ester group For example, use of the shorthand "2-1-P" refers to diglycerol monopalmitate; use of the short hand "6-2-O" refers to hexaglycerol dioleate; use of "2,3-1-S" refers to di-triglycerol monostearate. With respect to this nomenclature, the following definitions apply to the fatty acid aspect of the polyglycerol ester: O=oleic acid; P=palmitic acid; S=stearic acid; and IM=intermediate melting fatty acid.

The term "free polyol" refers to the portion of unesterified polyglycerol backbone in a given polyglycerol ester sample.

The term "psig" means pounds per square inch gauge.

The term "sheetable dough" means a dough capable of being placed on a smooth surface and rolled to the desired final thickness without tearing or forming holes.

The term "slivers" refers to thin sliced potato pieces that are separated from the products after the potato is cut into French fry strips. These pieces are generally the by-products from the length portion of the French fry strip and are typically shorter than the French fry itself.

The term "starch" refers to a native or an unmodified carbohydrate polymer having repeating anhydroglucose units derived from materials such as wheat, corn, tapioca, sago, rice, potato, oat, barley, ameranth; modified starches including but not limited to hydrolyzed starches such as maltodextrins, high amylose corn maize, high amylopectin corn maize; chemically substituted starches, cross linked starches; and mixtures thereof. Starch-based materials include, but are not limited to, potato flour, potato granules, corn flour, masa corn flour, corn grits, corn meal, buckwheat flour, rice flour, oat flour, bean flour, barley flour, tapioca, as well as modified starches, native starches, and dehydrated starches, starches derived from tubers, legumes and grains, for example corn starch, wheat starch, rice starch, waxy corn starch, oat starch, cassava starch, waxy barley, waxy rice starch, glutinous rice starch, sweet rice starch, potato starch, tapioca starch, and mixtures thereof.

All amounts, parts, ratios and percentages used herein are by weight unless otherwise specified.

All percentages are by weight unless otherwise specified.

II. Improved Emulsifier Systems For Making Dehydrated Starch Ingredients

As discussed above, Applicants have discovered that emulsifier systems that are more functional than current emulsifier systems are particularly useful in making dehydrated starch ingredients. Saturated monoglycerides are currently used exclusively in the starch dehydration industry. Under the high temperature (typically between 80 and 95° C.) and high moisture (greater than 50% moisture) dehydration conditions generally utilized, saturated monoglycerides exist predominantly in the cubic plus water phase, which is a relatively low functional phase. To compensate for their relatively low functionality under typical dehydration conditions, saturated monoglycerides are typically used at levels of approximately 0.3 to 0.5%, by weight of the resulting dehydrated starch ingredients normalized to 0% moisture content.

Applicants have surprisingly found that the improved emulsifier systems of the present invention are sufficiently functional in the range of from about 0.005 to about 0.2%, by weight of the resulting dehydrated starch ingredients normalized to 0% moisture content, in the dehydration process. Accordingly, a benefit of utilizing the emulsifier systems of the present invention is the ability of a formulator of farinaceous foods to reduce the level of the emulsifier needed as a processing aid in the drum drying operation. This reduces the cost of raw materials and also reduces the potential for the formation of off-flavors due to oxidation. By reducing the level of emulsifier in the dehydrated starch ingredients, in fat-free foods such as snacks fried in non-digestible fats like Olean® (sold by the Procter & Gamble Company, Cincinnati, Ohio), the end producer can use other sources of triglycerides while still providing a low-fat food and while meeting the regulatory requirements in many geographies to label the food as "fat free."

Conventional dehydrated potato ingredient processing with monoglyceride results in significant amylose complexation with this emulsifier, resulting in reduced levels of free amylose. Applicants have found that dehydrated ingredients made using the emulsifier systems of the present invention will contain higher levels of free amylose due to the reduced degree of complexation between free amylose and emulsifier(s). This may provide additional sheet strength when preparing doughs for production of farinaceous products. Accordingly, the present emulsifier systems provide benefits even when used at emulsifier levels currently used in the art (e.g., 0.3 to 0.5%).

In one preferred aspect, the emulsifier system is one that is alpha-stable upon formation of finished product made using dehydrated starch ingredients made according to the present disclosure.

In one aspect, the emulsifier system comprises a PGE. As defined in Section I, use of the term PGE herein refers to any polyglycerol ester having a polyglycerol backbone comprising from 2 to about 10 glycerol units, wherein not more than about 40% of the hydroxyl groups of the polyglycerol ester are esterified with fatty acids.

It is readily understood by those of ordinary skill in the art that PGEs are typically not obtainable in pure form (i.e., are not a single polyglycerol ester), and are usually (unless extra purification or distillation steps are taken) mixtures of different esters and different polyglycerol backbones. For that reason, when types of molecules are mentioned herein, it is meant that the material referred to is "predominantly" that material. For instance, a material referred to as diglycerol monoesters will include diglycerol monoesters as a significant component, but will often also include other polyglycerols (e.g., tri- to decaglycerols) as well as glycerol molecules. The diglycerol monoester-containing material will also typically include polyglycerols having differing numbers of ester groups; for example, di, tri, tetra, deca, etc. esters. Further, there will be unreacted polyglycerols and other by-products, or "impurities", as well, as will be understood and appreciated by one of skill in the art. In this context, the word "predominantly" refers to an emulsifier system or individual emulsifier that, depending on the context, includes at least about 40% of the named component; typically, the component will be included in an amount of at least about 60%.

In one aspect, the backbone of the PGE will contain from 2 to about 8 glycerol units. In another aspect the backbone of the PGE contains from 2 to about 5 glycerol units and in still another aspect the backbone of the PGE contains 2 or 3 glycerol units.

With respect to the amount of esterification, in one aspect the polyglycerol is not more than about 35% esterified with fatty acid groups. In another aspect the polyglycerol will be at least about 20% esterified.

The PGE will typically be esterified with at least about 80%, more typically at least about 90%, and most typically at least about 95%, saturated fatty acids. Further, the PGE will typically comprise less than about 50%, more typically less than about 10%, and most typically less than about 5% unsaturated cis and trans fatty acids. Preferred fatty acids include $C_{12}$, $C_{14}$, $C_{16}$, $C_{18}$, $C_{20}$, and $C_{22}$ fatty acids. More preferred fatty acids are $C_{16}$ and $C_{18}$ fatty acids.

Where the emulsifying system includes PGEs, the system will typically comprise less than about 30%, more typically less than about 20%, still more typically less than about 15%, total free polyglycerol.

Where the emulsifying system contains PGEs, in one aspect the system will contain not more than about 40% diesters. In another aspect, the system will contain not more than about 30% diesters. In yet another aspect, the system will contain not more than about 20% di-esters. Where the emulsifying system contains PGEs, in one aspect the system will contain not more than about 30% tri- and higher esters. In another aspect, the system will contain not more than about 20% tri- and higher esters. In yet another aspect, the system will comprise not more than about 10% tri- and higher esters.

In another preferred aspect, PGE emulsifier systems will preferably comprise less than about 5%, more preferably less than about 2%, cyclic diglycerol esters.

In one preferred aspect, the PGE emulsifier system will include relatively high levels of polyglycerol monoesters ("PGME"). Any PGME may be used alone, as the sole processing aid for dehydration. However, purifying PGMEs to isolate one PGME will typically be cost prohibitive. Thus, for most applications the PGME will exist as an emulsifier with multiple components (e.g., DGMEs, triglycerol monoesters, tetraglycerol monoesters, etc.) as a processing aid for dehydration. Where the emulsifier system comprises PGME, in one embodiment at least about 40% of the PGME component will be DGME. In a particularly preferred emulsifier system, at least about 75% of this DGME portion is made up of 2-1-S or 2-1-P, or mixtures thereof. Additionally, a 2-1-IM can be used in the DGME portion. Another particularly preferred system comprises di-triglycerol monoester (preferably at a level of at least about 40%, more preferably at a level of at least about 75%).

It is preferred that the PGME used herein be esterified with fatty acids chosen from oleic, palmitic and stearic, or IM fatty acids; however, fatty acids may range from $C_{12}$–$C_{22}$, and may be saturated or unsaturated, as described with respect to PGEs in general. In general, in order to avoid any oxidation issues, it may be desirable to minimize the level of unsaturated fatty acid esters.

In general, the following is a non-limiting list of particularly preferred PGEs for use in the improved emulsifier systems: 2-1-P, 2-1-S, 3-1-P, 3-1-S, 4-1-P, 4-1-S, 6-2-P, 6-2-S, 10-3-P and 10-3-S. In one aspect, 2-1-P, 2-1-S, 3-1-P, 3-1-S or any mixture thereof will be included in the emulsifier system. While 2-1-O, 3-1-O and other oleate-containing PGEs are functional under dehydration conditions, as mentioned the point of unsaturation may cause oxidation issues. Accordingly, in one aspect the emulsifier system will contain not more than about 25% of an emulsifier(s) having unsaturated fatty acid groups (e.g., 2-1-O). In another aspect, the system will comprise not more than about 5% of an emulsifier having unsaturated fatty acid groups.

In general, PGEs are synthesized in the following manner. In a first step, glycerol is polymerized to form the polyglycerol backbone. Linear and cyclic polyglycerol containing 2 to 10 glycerol units are formed in this reaction. The polyglycerol backbone is then esterified with fatty acids to produce polyglycerol esters forming mono-, di-, tri-, tetra- and higher esters.

For preferred PGEs, the polymerization process should be limited so that lower polyglycerols, mainly diglycerol and triglycerol, are produced. Alternatively, the mixed polyglycerols can be distilled to isolate the desirable di-triglycerols. To achieve high levels of desirable monoester, the mixed ester PGEs are molecular distilled to enrich the monoester. A developmental PGE sample comprising mainly 2,3-1-P is produced by Lonza Group (Fairlawn, N.J.) according to this general procedure.

To obtain relatively high levels of desirable diglycerol monoesters, commercially available diglycerol is esterified with fatty acid to form diglycerol mono-, di-, tri- and higher esters. Molecular distillation is used to isolate diglycerol monoesters. 2-1-P is commercially available from Danisco Cultor (New Century, Kans.) and is produced according to this general procedure.

Another emulsifier that can be used in the emulsifier system of the present invention, either alone or in combination with other components, is diacetyl tartaric acid ester monoglyceride (DATEM). As discussed in the Definitions section, supra, DATEM is a monoglyceride (having an esterified fatty acid ranging from 12 to about 22 carbon atoms) that is esterified with diacetyl tartaric acid. The fatty acid may be saturated or unsaturated. The Iodine Value (IV) of the diacetyl tartaric acid monoglyceride is from about 1 to about 110. Preferably, the IV is from about 1 to about 20. The functionality of DATEM is enhanced by adjusting the pH of the dispersion to a pH of from about 5 to about 7.

While the emulsifier system of the present invention may include only one or a combination of PGEs or DATEM, it is possible to replace some portion of those emulsifiers with one or more other emulsifiers and still provide an overall system that exhibits the desired functionality under typical dehydration conditions. This is important because certain emulsifiers, and particularly DGMEs, are relatively expensive. Accordingly, it may be desirable to have a portion of the emulsifier system comprised of other emulsifiers, so long as the desired functionality of the emulsifier system is maintained under dehydration conditions.

The ability to replace the PGE or DATEM and the relative amount of that replacement will be dictated by several factors, including the functionality of the emulsifier(s) used. For example, where a 'highly functional' emulsifier (e.g. a PGE comprised predominantly of 2-1-P or 3-1-P) is used, it may be possible to include higher levels of other emulsifiers while maintaining the desired functionality of the entire emulsifier system.

In one such system, the PGE or DATEM can be blended with monoglyceride or mono-diglyceride that is currently used (at relatively high levels) in the dehydration process. Preferably, the monoglyceride is derived from, for example, hydrogenated or partially hydrogenated soybean oil, rapeseed oil, cottonseed oil, sunflower seed oil, palm oil, palm olein, safflower oil, corn oil, peanut oil, palm stearin, tallow, lard and mixtures thereof. The use of hydrogenated or partially hydrogenated monoglycerides ensures oxidative stability. For these systems, preferred emulsifier systems comprise from about 40% to about 99% PGE and from about 60% to about 1% monoglyceride; typically, such a blend will comprise from about 40% to about 60% PGE and from about 60% to about 40% monoglyceride. When monoglyceride is used, it is preferred that a PGME or DATEM be used; more preferred is the use of a PGME; most preferred is the use of a DGME or di-triglycerol monoesters.

In another aspect, the PGE or DATEM can be blended with a lecithin to provide an emulsifier system useful herein. In this regard, a preferred emulsifier system comprises not more than about 75%, and most preferably from about 1% to about 25%, of a lecithin, and at least about 25%, most preferably from about 75% to about 99%, of a PGE or DATEM. Preferred is where PGME is blended with lecithin.

In another aspect, the invention relates to an improved emulsifier system useful in making dehydrated starch ingredients, wherein the emulsifier system exists as a stable dispersion at a temperature of at least about 80° C. As discussed, because most processing in the starch dehydration process occurs under high temperature and high moisture conditions, it is believed that emulsifier systems exhibiting the above dispersibility properties are able to function robustly under such typical dehydration conditions. In contrast to emulsifier systems that exist as a stable dispersion at a temperature of at least about 80° C., under the high temperature and high moisture dehydration conditions generally utilized, saturated monoglycerides exist predominantly in the cubic plus water phase, which is a relatively low functional phase. In other words, conventional emulsifier systems do not exist as a stable dispersion at temperatures of about 80° C. or higher.

One preferred embodiment of an emulsifier system that exists as a stable dispersion at at least 80° C. comprises PGEs with relatively high levels of DGME and/or di-triglycerol monoesters, which are described above. Another preferred embodiment comprises DATEM. Due to their dispersibility and functionality, these systems can be used at very low levels in the dehydration process.

Applicants have identified emulsifier systems that provide the desired dispersibility under dehydration conditions (i.e., exist as a stable dispersion at a temperature of at least about 80° C.). These emulsifier systems will typically contain at least one emulsifier that itself exists as a stable dispersion. While a given emulsifier system may contain only an emulsifier (or combination of emulsifiers) having those physical properties, it is possible to combine one or more such emulsifiers with other emulsifiers that themselves do not exhibit the desired dispersed phase at a temperature of about 80° C. In general, based on Applicants' discovery and the present disclosure, one can readily select useful emulsifiers based on their ability to form the desired dispersion (as measured according to the Analytical Method set forth below) under the processing conditions indicated herein.

It will be understood that while certain PGE- or DATEM-containing emulsifier systems do not exist as stable dispersions at 80° C., they are still sufficiently functional for preparing dehydrated starch ingredients, albeit at potentially higher concentrations.

III. Dehydrated Starch Ingredients and Processing of those Ingredients

The present invention is also directed to a process for making dehydrated starch ingredients. The process is particularly suitable for making dehydrated potato ingredients.

The process of the present invention will be described emphasizing the preparation of dehydrated potato flakes. This is by way of illustration and not limitation. In its broadest aspect, the process of the present invention is generally applicable to the preparation of dehydrated vegetables (e.g., potatoes, sweet potatoes, beets, spinach, onion, carrots, celery, pumpkin, tomatoes, zucchini, broccoli, mushrooms, peas); grains such as corn products (e.g., masa), barley, oats, rye, wheat, rice, amaranth, sago and cassava); and the like. The present invention is also applicable in producing flakes that can be used in baby foods. The process of the present invention can also be applied for other starch containing materials such as glues and pharmaceutical materials.

The following provides a detailed discussion of the improved potato ingredients that result from the use of the improved emulsifier system described above.

A. Production of Dehydrated Potato Ingredients

Any commercially available potatoes used to prepare conventional potato ingredients such as flakes, flanules or granules can be used to prepare the dehydrated potato ingredients of the present invention. Preferably, the dehydrated ingredients are prepared from potatoes such as, but not limited to, Norchip, Norgold, Russet Burbank, Lady Russeta, Norkota, Sebago, Bentgie, Aurora, Saturna, Kinnebec, Idaho Russet, and Mentor.

Any of a variety of potato pieces (as used herein, "potato pieces" includes potato by-products, e.g. slivers, slices nubbins, or slabs) can be used in the practice of the present invention.

In one embodiment the potato pieces are pre-conditioned. As used herein "pre-conditioned" refers to treatments such as blanching and cooling, which causes the potato cells to toughen.

1. Cooking

The potatoes are subjected to a cooking procedure sufficient to soften them for subsequent mashing. The cooking procedure can be any thermal or other type of cooking process that softens the potatoes for mashing. For instance, the potatoes may be cooked by submersion in water or steam. It will be recognized that use herein of the term "cook" includes what is sometimes referred to in the art as "partial cooking". What is important is that the potatoes be processed to a sufficient degree to allow subsequent mashing.

The actual temperature and length of time the potatoes and/or potato pieces are cooked depends upon the size of the potatoes and/or potato pieces that are being cooked and the cooking method employed (i.e., steam pressure, boiling temperature). Typically, the potatoes will be cooked for a time sufficient to swell the potato cells and starch granules and to separate the potato cells from each other.

For example, potato slices having an average thickness of about 0.375 in. (0.95 cm) to about 0.5 in. (1.3 cm) are typically cooked with steam having a temperature of from about 200°F. (93° C.) to about 250° F. (121° C.) from about 12 to about 30 minutes, more typically from about 14 to about 18 minutes, to achieve the desired softness. Shoestring cut potatoes pieces are typically cooked with steam having a temperature of from about 200° F. (93° C.) to about 250° F. (121° C.) for about 7 to about 18 minutes, more typically from about 9 to about 12 minutes, to achieve the desired softness.

One optional cooking process is described in U.S. Pat. No. 6,066,353, issued May 23, 2000 to Villagran et al. Another optional process is disclosed in U.S. Ser. No. 09/907,059, filed Jul. 17, 2001 by Villagran et al., which discloses a reduced cooking process that may provide enhanced flavor character of the resulting dehydrated potato ingredient. The disclosure of each of these references is incorporated herein by reference.

2. Potato Mash Formation

The cooked potatoes are comminuted to produce a potato mash. Comminution of the cooked potatoes may be accomplished by any suitable means, including but not limited to ricing, mashing, shredding, or a combination thereof. U.S. Pat. No. 6,066,353 describes one suitable process for forming the mash. In essence, the mash formation step is performed to reduce the size of the potato pieces such that the mash can be appropriately handled in the subsequent dehydration step.

Additional ingredients can also be added to the potato mash to improve the storage stability of the resulting dehydrated potato ingredients. Various stabilizers and preservatives are usually employed to improve the stability and texture of the resulting potato ingredient. For example, from about 150 to about 200 parts per million (ppm) of sulfite may be provided in the dry product. This is added to the mash usually as dry sodium sulfite and sodium bisulfite and protects the resulting ingredients from darkening during processing and subsequent storage. Antioxidants such as BHA (2 and 3-tert-butyl-4-hydroxy-anisole) and BHT (3,5-di-tert-butyl-4-hydroxytoluene) may be added in an amount up to a total of about 10 ppm in the dry product to prevent oxidative deterioration. Citric acid may be added in a quantity sufficient to give about 90 ppm in the dried product to prevent discoloration caused by the presence of ferrous ions. Ascorbic acid can also be added to warrant the initial level of vitamins.

Optionally, starch can be added to the potato mash in order to impart improved characteristics to the mash itself and/or to the products made therefrom. When added, preferably from about 0.5% to about 50%, more preferably from about 2% to about 30%, and still more preferably from about 4% to about 15% starch (on a dehydrated starch ingredient basis) is mixed with the wet mash and is uniformly distributed throughout.

The benefits of starch addition to the potato mash include: (1) improved water distribution in the mash, (2) decreased adhesiveness of the mash to the drum in the drying step, (3) increased productivity rate by increasing the surface porosity and solids content of the mash, thereby reducing the residence time for drying to achieve the desired moisture content of the dehydrated potato products, (4) increased cohesiveness of the freshly mashed potatoes, and (5) increased crispiness of fabricated chips, due to a decreased level of soluble amylopectin.

3. Drying

After forming the potato mash, the mash is at least partially dried to form dehydrated potato ingredients having a final moisture content of not more than about 30%. Final moisture content is measured according to the procedure set forth in the "Analytical Methods" section of U.S. Ser. No. 09/907,059, filed Jul. 17, 2001 by Villagran et al. These dehydrated potato ingredients can be in any form, including but not limited to flakes, flanules, granules, agglomerates, sheets, pieces, bits, flour, or particulates. (Of course, the skilled artisan will recognize that the mash may be used in preparing other products, including mashed potatoes.) For stability reasons, it is preferred that the dehydrated potato ingredients have a final moisture content of not more than about 15%. For dehydrated potato ingredients (e.g., flakes, granules and flanules) that will be processed into farinaceous snacks, the ingredients will typically have a final moisture content of from about 5 to about 10%.

Any suitable procedure, such as those known in the art, for producing such dehydrated potato products from a potato mash may be employed, and any suitable equipment may be used. For example, the mash can be dried to produce flakes according to known processes such as those described in U.S. Pat. No. 6,066,353, issued May 23, 2000 to Villagran et al., as well as those processes described in U.S. Pat. No. 2,759,832 issued Aug. 19, 1956 to Cording et al., and U.S. Pat. No. 2,780,552 issued Feb. 5, 1957 to Willard et al, all of which are incorporated herein by reference. The mash can be dried to make flanules according to the process set forth in U.S. application Ser. No. 09/175,138, filed Oct. 19, 1998, which is incorporated herein by reference. Granules can be produced by processing the mash according to the process described in U.S. Pat. No. 3,917,866, issued Nov. 4, 1975 to Purves et al., or by other known processes such as that described in U.S. Pat. No. 2,490,431 issued Dec. 6, 1949 to Greene et al., all of which are incorporated herein by reference. Suitable dryers can be selected from those well known drying devices including but not limited to fluidized bed dryers, scraped wall heat exchangers, drum dryers, freeze-dryers, air lift dryers, and the like.

Preferred drying methods include those that reduce the amount of total thermal input. For example, freeze drying, drum drying, resonant or pulse flow drying, infrared drying, or a combination thereof is preferred when producing flakes; and air lift drying, fluidized bed drying, or a combination thereof is preferred when producing granules.

Drum drying, such as with drum dryers commonly used in the potato product industry, is the preferred method for drying the potato mash to form the dehydrated potato ingredients. The preferred process utilizes a single drum dryer wherein the wet potato mash is spread onto the drum in a thin sheet having a thickness of from about 0.005 in. (0.013 cm) to about 0.1 in. (0.25 cm), preferably from about 0.005 in. (0.013 cm) to about 0.05 in. (0.12 cm), more preferably about 0.01 in. (0.025 cm). Typically, when a drum dryer is used, the mash is fed to the top surface of the drum by a conveying means. Small diameter unheated rolls progressively apply fresh potato mash to portions already on the drum, thus building up a sheet, or layer, having a predetermined thickness. The peripheral speed of the small rolls is the same as that of the drum. After the layer of mash travels around a portion of the circumference of the drum, a doctor knife removes the dried sheet by peeling the dried sheet away from the drum. Typically, the drum dryer itself is heated to temperatures in a range of from about 250° F. (121° C.) to about 375° F. (191° C.), preferably from about 310° F. (154° C.) to about 350° F. (177° C.), and more preferably from about 320° F. (160° C.) to about 333° F. (167° C.) by pressurized steam contained within the drum at pressures of from about 70 psig to about 140 psig. For best results, the rotational speed of the drum and the internal temperature thereof are suitably controlled so as to give a final product having a moisture content of from about 5% to about 14%, preferably from about 5% to about 12%. Typically, a rotational speed of from about 9 sec/rev to about 25 sec/rev., preferably about 11 sec/rev to about 20 sec/rev, is sufficient.

Other dehydrated potato ingredients that can be improved by the use of the emulsifying system of the present invention include potato granules and flanules. Conventional potato granules and flanules generally contain more flavor than potato flakes and a substantial amount of unbroken cells. The primary difference between granules and flanules is that granules contain lower levels of free amylose.

Potato granules are typically processed using an "add-back" process. In this process, potatoes are washed, peeled, sliced, and precooked. Following precooking, the slices are cooled in water. The precooked and cooled potato (i.e. conditioned) slices are cooked with steam until the structure becomes weak and the potato pieces are soft. The fully cooked potato slices are mashed. The mash is mixed with a fixed ratio of dry granules (add-back process) to reduce the moisture level. Further drying is accomplished by using a fluidized bed and an airlift dryer to achieve the desired final moisture content. The drying step in the granule process is gentler than that used in flake production and minimizes potato cell disruption. The relatively low level of amylose released in the process crystallizes and becomes water-insoluble. See *Potato Processing*, $4^{th}$ Ed., Talburt, W. and Smith, O., AVI—Van Nostrand Reinhold Company, Inc. (New York, N.Y.) (1987).

In the flanules process, the primary differences are the elimination of the precooking and cooling steps, as well as reduced conditioning of the potato mash. For a detailed discussion of both product and process differences between granules and flanules, see U.S. Pat. No. 6,287,622, issued Sep. 11, 2001, to Villagran et al., which is incorporated herein by reference.

4. Emulsifier System Addition

The improved emulsifier system of the present invention can be added during or between the cooking, mashing and drying steps, or any combination thereof. To aid in processing, most preferred is where the emulsifier system is combined with the cooked potatoes just prior to or during the mashing step.

As mentioned above, the amount of emulsifier needed will depend on the functionality of the components thereof. When preferred emulsifiers are used, the emulsifier system will be added such that the finished potato ingredient comprises not more than about 0.2% of the emulsifier system (when normalized to a 0% moisture content). Typically, from about 0.005% to about 0.2%, of the emulsifier system will be added. More typically, from about 0.005% to about 0.1% will be added during the dehydration process.

5. Optional Comminution

Once the wet mash is sheeted and dried, the resulting dried sheet can then be comminuted into smaller sections if desired. These smaller sections can be of any desired size. Any method of comminuting the sheet that minimizes starch and potato cell damage, such as fracturing, grinding, breaking, cutting, or pulverizing, can be used. For example, the sheet can be comminuted with an Urschel Comitrol™, manufactured by Urschel Laboratories, Inc. (Valparaiso, Ind.), to break up the sheet. Alternatively, the sheet can be left intact. As used herein, both the intact sheet of flakes and smaller sheet sections are included in the term "potato flakes."

B. Potato Ingredient Properties

The potato ingredients resulting from the processes described above are unique in terms of their emulsifier composition. In particular, the potato ingredients comprise an emulsifier selected from the group consisting of (i) a PGE, (ii) a DATEM, and (iii) mixtures thereof. Typically, the potato ingredients of the present invention comprise from about 0.005% to about 0.2% of the emulsifier system described above (again, normalized to a 0% moisture content).

Beyond the emulsifier content of the potato ingredients, the ingredients made using the present emulsifier systems will generally have physical and chemical characteristics similar to existing potato ingredients. Those characteristics are well known in the literature, as are process parameters for controlling those characteristics. See, e.g., U.S. Pat. No. 6,066,353, issued May 23, 2000 to Villagran et al. and U.S. Ser. No. 09/907,059, filed Jul. 17, 2001 by Villagran et al., both discussed supra.

As a result of being processed using the improved emulsifier systems described above, the potato ingredients provide benefits, relative to existing potato ingredients, when processed into finished products such as farinaceous chips. One important difference appears to derive from the relatively low levels of emulsifier present in the potato ingredients. Conventional potato ingredient processing with monoglyceride results in significant amylose complexation with this emulsifier. The ingredients of this invention will contain higher levels of free amylose due to a lower degree of complexation between amylose and emulsifier and may contain a lower level of emulsifier. A method for measuring free amylose levels is described in U.S. Pat. No. 6,066,353, issued May 23, 2000, to Villagran et al. (see Analytical Methods section therein), the disclosure of which is incorporated herein by reference.

IV. Fabricated Farinaceous Products

Although the disclosure of final products derived from the dehydrated starch ingredients described above relates primarily to the formation of fabricated chips, it will be readily apparent to one skilled in the art that the dehydrated ingredients can be used in the production of any suitable food product. For instance, the dehydrated potato products can be rehydrated and used to produce food products such as mashed potatoes, potato patties, potato pancakes, potato soup, and other potato snacks such as extruded French fries and potato sticks. For mashed potatoes, potato flakes may be coarsely ground to about 0.1–1 cm$^2$. Optionally, seasonings such as salt, pepper, onion powder, garlic powder, MSG, butter flavors, or cheese powder, may be added to the ground flakes before packaging. Additionally, various stabilizers may be added, for example BHT and citric acid. The consumer prepares the mashed potatoes by adding the potato flakes to hot water containing salt, margarine and milk. The product is mixed and is ready for consumption in a few minutes.

Alternatively, dehydrated starch ingredients can be used to produce extruded French fried potato products such as those described in U.S. Pat. No. 3,085,020, issued Apr. 9, 1963 to Backinger et al., and U.S. Pat. No. 3,987,210, issued Oct. 18, 1976 to Cremer, both of which are herein incorporated by reference. The dehydrated potato products can also be used in breads, gravies, sauces, or any other suitable food product.

As indicated, an especially preferred use of the dehydrated potato ingredients is in the production of fabricated chips made from a dough. Examples of such fabricated chips include those described in U.S. Pat. No. 3,998,975 issued Dec. 21, 1976 to Liepa, U.S. Pat. No. 5,464,642 issued Nov. 7, 1995 to Villagran et al., U.S. Pat. No. 5,464,643 issued Nov. 7, 1995 to Lodge, PCT Application No. PCT/US95/07610 published Jan. 25, 1996 as WO 96/01572 by Dawes et al., and U.S. Pat. No. 5,928,700 issued Jul. 27, 1999 to Zimmerman et al., each of which is incorporated herein by reference.

The following describes the formation of doughs and farinaceous products made from those doughs.

A. Dough Compositions

The doughs of the present invention comprise from about 35% to about 85%, preferably from about 50% to about 70%, of a starch-based flour. The starch-based flour comprises a dehydrated starch ingredient of the present invention. In a preferred aspect, the starch-based flour will comprise from about 25 to 100%, more preferably from about 50 to about 75%, dehydrated potato flakes of the present invention, with the balance (from about 0% to about 75%) being other starch-based flours including, but not limited to, potato flour, potato flanules, potato granules, corn flour, masa corn flour, corn grits, corn meal, buckwheat flour, rice flour, oat flour, bean flour, amaranth flour, barley flour, modified and unmodified corn and wheat starches, or mixtures thereof. These other ingredients may be prepared according to the present invention or may be ingredients previously known in the art.

The doughs of the present invention also preferably comprise from about 15% to about 50% added water, preferably from about 22% to about 40%, and more preferably from about 24% to about 35%, added water. The amount of added water includes any water used to dissolve or disperse ingredients and includes water present in corn syrups, etc. For example, if ingredients such as maltodextrin or corn syrup solids are added as a solution or syrup, the water in the syrup or solution is included as "added water."

The dough can optionally include a starch such as a native, modified, or resistant starch. From about 0.1% to about 70%, more preferably from about 5% to about 60%, and most preferably from about 15% to about 40% starch may be added. The starch can be derived from tubers, legumes, or grains and can include, but is not limited to, corn starch, wheat starch, rice starch, waxy corn starch, oat starch, cassava starch, waxy barley, waxy rice starch, glutinous rice starch, sweet rice starch, potato starch, tapioca starch, amaranth starch, sago starch, or mixtures thereof. When calculating the level of starch according to the present invention, starch that is inherent in the other ingredients, such as potato flakes, potato flanules, potato granules, and flours, is not included. (The level of starch is that which is added over and above that level inherently present in the other dough ingredients.)

Modified starch selected from the group consisting of pregelatinized starches, cross-linked starches, acid modified starches, and mixtures thereof may optionally be included to improve the texture (i.e. increase the crispness) of the fabricated chip, although the addition of modified starch is not required, and is not as preferred for use in making the fabricated chip of the present invention. From about 0.1% to about 20%, more preferably from about 1% to about 10%, modified starch may typically be added. If used, the modified starches which are preferred are available from National Starch and Chemical Corporation, Bridgewater, N.J. and are sold under the trade names of N-Lite™ (pregelatinized-crosslinked starch), Ultrasperse®-A (pregelatinized, waxy corn), and N-Creamer™ 46 (substituted waxy maize). When calculating the level of modified starch according to the present invention, modified starch (e.g., gelatinized starch) that is inherent in the other ingredients, such as potato flakes, potato flanules, potato granules, and flours (e.g., partially pre-cooked corn meal such as Corn PCPF400™ available from Bungee Lauhoff Corn Milling, St. Louis, Mo.), is not included. (The level of modified starch is that which is added over and above that level inherently present in the other dough ingredients.)

Hydrolyzed starch is a preferred modified starch that can be optionally included in the doughs of the present invention. When included, hydrolyzed starch is typically added to the dough at a level of from about 1% to about 15%, preferably from about 3% to about 12%. This amount of hydrolyzed starch is in addition to the quantity of any other added starch. Suitable hydrolyzed starches for inclusion in the dough include maltodextrins and corn syrup solids. The hydrolyzed starches for inclusion in the dough typically have Dextrose Equivalent (DE) values of from about 5 to about 30, preferably from about 10 to about 20. Maltrin™ M050, M100, M150, M180, M200, and M250 (available from Grain Processing Corporation, Iowa) are preferred maltodextrins. The DE value is a measure of the reducing equivalence of the hydrolyzed starch referenced to dextrose and is expressed as a percentage (on a dry basis). The higher the DE value, the higher the dextrose equivalence of the hydrolyzed starch.

Gums may also be optionally used in the dough of the present invention. Gums for use in the present invention include those ingredients generally referred to as gums (e.g., cellulose derivatives, pectic substances) as well as plant gums. Examples of suitable gums include, but are not limited to, guar gum, xanthan gum, gellan gum, carrageenan gum, gum arabic, gum tragacanth, and pectic acids having various degrees of depolymerization and methylation. Particularly preferred gums are cellulose derivatives selected from methylcellulose, hydroxypropyl methyl cellulose, carboxymethylcellulose, microcrystalline cellulose, and mixtures thereof. Gums can be included in the dough at a level of up to about 10%, preferably at a level of from about 0.2% to about 8%, and more preferably from about 2% to about 4%.

As discussed above, the emulsifier system used in preparing the dehydrated potato ingredients preferably provides alpha stable finished products made from those dehydrated ingredients. This property tends to provide significant improvements over the current emulsifier used in processing dehydrated starch products. Particularly preferred in this aspect of the invention is an emulsifier system comprising PGEs, DATEM and lecithin.

While the precise mechanism of action is not well understood, it is believed that the emulsifier system used in processing the dehydrated ingredients interacts with other textural agents (e.g., leavening agent) during subsequent dough preparation, thereby enhancing the final effect on the product. Particularly preferred in this aspect of the invention is an emulsifier system comprising PGEs, DATEM and lecithin. This system is suited for compositions comprising pregelatinized starch and gluten, if used in making the doughs.

While the dehydrated potato ingredients contain the emulsifier system used in the dehydration process, it may be desirable to add dough emulsifier(s) during the preparation of the dough to aid in its processability. The skilled artisan will recognize that a variety of known emulsifiers can be used in the dough making process. See, e.g., U.S. Pat. No. 6,066,353, issued May 23, 2000 to Villagran et al. and U.S. Ser. No. 09/907,059, filed Jul. 17, 2001 by Villagran et al., both discussed supra.

Typically, such dough emulsifiers are added to the dough in an amount of from about 0.01% to about 6%, preferably from about 0.1% to about 5%, and more preferably from about 1% to about 4%, on a dough basis. A dough emulsifier is preferably added to the dough composition prior to sheeting the dough. The dough emulsifier can be dissolved in a oil or in a polyol fatty acid polyester such as Olean®, available from The Procter and Gamble Company. Suitable dough emulsifiers include lecithin, mono-diglycerides, DATEM, propylene glycol mono- and diesters, and PGEs (e.g. PGMEs). Particularly preferred monoglycerides are sold under the trade names of Dimodan® available from Danisco Cultor, New Century, Kans. and DMG 130 available from Archer Daniels Midland Company (ADM), Decatur, Ill. Particularly preferred mono-diglycerides are Aldo® MO available from Lonza Group, Fairlawn, N.J.

For sheeted products, the dough emulsifier helps to control (i) the stickiness of the dough sheet, (ii) the expansion of the finished product, (iii) the texture and eating quality of the finished product, and (iv) the oil absorption of the finished product.

For extruded products, the dough emulsifier helps to (i) control the amount of oil absorbed by the half-product during frying, (ii) control the expansion of the half-product during frying, (iii) reduce starch breakdown during extrusion, and (iv) lubricate the extrusion barrels. In the practice of the present invention, it has been found to be particularly advantageous to add the emulsifier to the dry ingredients blend to prevent the starch from hydrating too quickly. The starches are then less susceptible to mechanical shear in the extrusion barrel.

When PGEs are used in the dough making step, the PGE will optionally be diglycerol monoesters derived from unsaturated fatty acids, triglycerol monoesters derived from unsaturated fatty acids, mixtures of di-triglycerol monoesters derived from unsaturated fatty acids, diglycerol diesters derived from unsaturated fatty acids, triglycerol diesters derived from unsaturated fatty acids, mixtures of di-triglycerol diesters derived from unsaturated fatty acids, and mixtures thereof. The PGEs may optionally be distilled.

When lecithins are used, the lecithin can be selected from deoiled lecithin, liquid lecithin, lyso lecithin, chemically modified lecithin, egg lecithin, egg yolk powder and phosphotidyl choline enriched lecithin, and mixtures thereof.

When triglyceride oil is used, it may be derived from sunflower, soybean, cottonseed, canola, tallow or peanut oil, or any mixture of the foregoing.

Although not in any way limiting, the following describes specific dough emulsifiers or combinations of dough emulsifiers to be used in the dough making step: (i) mono-diglyceride; (ii) mono-diglyceride and triglyceride oil; (iii) mono-diglyceride, triglyceride oil and lecithin, (iv) mono-diglyceride, triglyceride oil and PGE, (v) mono-diglyceride, triglyceride oil, PGE and lecithin; (vi) PGE; (vii) PGE and triglyceride oil, (viii) PGE, triglyceride oil and lecithin, (ix) DATEM, (x) DATEM and triglyceride oil, (xi) DATEM and PGE, and (xii) lecithin and triglyceride oil. Mono-diglyceride may be substituted, in whole or in part, by monoglyceride.

Applicants have discovered that by preparing doughs using dehydrated potato ingredients (e.g., flakes, flanules and/or granules) made using the emulsifier systems described herein (e.g., comprising PGE, DATEM or a combination thereof), it is possible to use emulsifiers that previously were not readily useful in making those doughs. In particular, Applicants have found that dough emulsifiers that are liquid at room temperature can be employed as a result of using the potato ingredients of the present invention. The benefits associated with using such liquid dough emulsifiers include: (i) resulting finished products having better eating qualities in terms of flavor display and faster mouth melt, similar to non-fabricated chips; (ii) in seasoned products, needing less seasoning to achieve the same flavor display when compared to products prepared using hydrogenated or partially hydrogenated emulsifiers; and (iii) a less waxy mouth feel that would otherwise result from the use of current hydrogenated or partially hydrogenated emulsifiers.

In one embodiment, the dough composition of the present invention comprises:

(a) from about 50% to about 70% of a starch-based material wherein said starch-based material comprises up to 75% potato flanules and at least 25% of other starch-based materials;
(b) at least about 3% hydrolyzed starches having a DE of from about 5 to about 30; and
(c) from about 20% to about 47% added water.

Optionally, from about 0.5% to about 6% of emulsifier may be added to the dough compositions as a processing aid.

B. Dough Preparation

The doughs of the present invention can be prepared by any suitable method for forming sheetable doughs. Typically, a loose, dry dough is prepared by thoroughly mixing together the ingredients using conventional mixers. Preferably, a pre-blend of the wet ingredients and a pre-blend of the dry ingredients are prepared; the wet pre-blend and the dry pre-blend are then mixed together to form the dough. Hobart® mixers are preferred for batch operations and Turbulizer® mixers are preferred for continuous mixing operations. Alternatively, extruders can be used to mix the dough and to form sheets or shaped pieces.

The sheet strength of the dough correlates to the cohesiveness of the dough and to the ability of the dough to resist developing holes and/or tearing during subsequent processing steps. The higher the sheet strength, the more cohesive and elastic the dough.

The sheet strength of the dough of the present invention increases as the amount of energy input during the dough-making step increases. Factors that can affect energy input include, but are not limited to, mixing conditions, dough sheet formation, and the amount of measurable free amylose.

C. Sheeting

Once prepared, the dough is then formed into a relatively flat, thin sheet. Any method suitable for forming such sheets from starch-based doughs can be used. For example, the sheet can be rolled out between two counter rotating cylindrical rollers to obtain a uniform, relatively thin sheet of dough material. Any conventional sheeting, milling and gauging equipment can be used. The mill rolls should preferably be heated to from about 90° F. (32° C.) to about 135° F. (57°C.). In a preferred embodiment, the mill rolls are kept at two different temperatures, with the front roller being cooler than the back roller. The dough can also be formed into a sheet by extrusion.

Doughs of the present invention are usually formed into a sheet having a thickness of from about 0.015 to about 0.10 inches (from about 0.038 to about 0.25 cm), and preferably to a thickness of from about 0.05 to about 0.10 inches (from about 0.013 to about 0.025 cm), and most preferably from about 0.065 inches to about 0.080 inches (1.65 to 2.03 mm). For rippled (wavy shaped) fabricated chips, the preferred thickness is about 0.075 inches (1.9 mm).

The dough sheet is then formed into snack pieces of a predetermined size and shape. The snack pieces can be formed using any suitable stamping or cutting equipment. The snack pieces can be formed into a variety of shapes. For example, the snack pieces can be in the shape of ovals, squares, circles, a bowtie, a star wheel, or a pin wheel. The pieces can be scored to make rippled chips as described by Dawes et al. in PCT Application No. PCT/US95/07610, published Jan. 25, 1996 as WO 96/01572, which is herein incorporated by reference.

D. Frying

After the snack pieces are formed, they are cooked until crisp to form fabricated chips. The snack pieces can be fried in an oil composition comprising digestible oil, non-digestible fat, or mixtures thereof. For best results, clean frying oil should be used. The free fatty acid content of the oil should preferably be maintained at less than about 1%, more preferably less than about 0.3%, in order to reduce the oil oxidation rate.

In a preferred embodiment of the present invention, the frying oil has less than about 25% saturated fat, preferably less than about 20%. This type of oil improves the lubricity of the finished fabricated chips such that the finished fabricated chips have an enhanced flavor display. The flavor profile of these oils also enhances the flavor profile of topically seasoned products because of the oils' lower melting point. Examples of such oils include sunflower oil containing medium to high levels of oleic acid.

In another embodiment of the present invention, the snack pieces are fried in a blend of non-digestible fat and digestible oil. Preferably, the blend comprises from about 20% to about 90% non-digestible fat and from about 10% to about 80% digestible oil, more preferably from about 50% to about 90% non-digestible fat and from about 10% to about 50% digestible oil, and still more preferably from about 70% to about 85% non-digestible fat and from about 15% to about 30% digestible oil.

Other ingredients known in the art can also be added to the edible fats and oils, including antioxidants such as TBHQ, tocopherols, ascorbic acid, chelating agents such as citric acid, and anti-foaming agents such as dimethylpolysiloxane.

It is preferred to fry the snack pieces at temperatures of from about 275° F. (135° C.) to about 420° F. (215° C.), preferably from about 300° F. (149° C.) to about 410° F. (210° C. and more preferably from about 350° F. (177° C.) to about 400° F. (204° C.) for a time sufficient to form a product having about 6% or less moisture, preferably from about 0.5% to about 4%, and more preferably from about 1% to about 2% moisture. The exact frying time is controlled by the temperature of the frying oil and the starting water content of the dough, which can be easily determined by one skilled in the art.

Preferably, the snack pieces are fried in oil using a continuous frying method and are constrained during frying. This constrained frying method and apparatus is described in U.S. Pat. No. 3,626,466 issued Dec. 7, 1971 to Liepa, which is incorporated herein by reference. The shaped, constrained snack pieces are passed through the frying medium until they are fried to a crisp state with a final moisture content of from about 0.5% to about 4%, preferably from about 1% to about 2%.

Any other method of frying, such as continuous frying or batch frying of the snack pieces in a non-constrained mode, is also acceptable. For example, the snack pieces can be immersed in the frying oil on a moving belt or basket.

The fabricated chips made from this process typically have from about 20% to about 45%, and preferably from about 25% to about 40%, total fat (i.e., combined non-digestible and digestible fat). If a higher fat level is desired to further improve the flavor or lubricity of the fabricated chips, an oil, such as a triglyceride oil, can be sprayed or applied by any other suitable means onto the fabricated chips when they emerge from the fryer, or when they are removed from the mold used in constrained frying. Preferably, the triglyceride oils applied have an IV greater than about 75, and most preferably above about 90. The additionally applied oil can be used to increase the total fat content of the fabricated chips to as high as 45% total fat. Thus, fabricated chips having various fat contents can be made using this additional step. In a preferred embodiment, at least 10%, preferably at least about 20%, of the total fat in the finished fabricated chips is topical surface fat.

Oils with characteristic flavor or highly unsaturated oils can be sprayed, tumbled or otherwise applied onto the fabricated chips after frying. Preferably triglyceride oils and non-digestible fats are used as a carrier to disperse flavors and are added topically to the fabricated chips. These include, but are not limited to, butter flavored oils, natural or artificial flavored oils, herb oils, and oils with potato, garlic, or onion flavors added. This allows the introduction of a variety of flavors without having the flavor undergo browning reactions during the frying. This method can be used to introduce oils that would ordinarily undergo polymerization or oxidation during the heating necessary to fry the snacks.

V. Analytical Methods

1. Supercritical Fluid Chromatography (SFC) Characterization

The ester composition of a PGE sample can be analyzed by SFC as previously described (see T. L. Chester and D. P. Innis, *Journal of High Resolution Chromatography and Chromatography Communications*, 9 (1986) 178–181) with the following modifications. Separations are carried out on a Dionex Superbond sb-methyl-100 capillary column, 10-m×50-mm, 0.25-mm film. Instrument conditions are as follows: Oven temp, 150° C.; pressure program, 100 bar initial pressure, then 1 bar/min to 110 bar, 5 bar/min to 400 bar, returning to initial conditions at −50 bar/min. Eluting components are identified based upon mass spectrometry data and quantified using unity response factors and area normalization.

2. High Performance Liquid Chromatography (HPLC) Characterization

The ester composition of a PGE sample can also be analyzed by programmed reverse-phase HPLC using evaporative light scattering detection. Each is diluted in acetone to which a few drops of water are added to help solubilize free polyglycerol. One-hundred micrograms of sample are injected onto a Beckman Ultrasphere ODS column (5 mm, 4.6 mm×250 mm) connected in series to a second identical column. Separations are carried out at 40° C. and a flow rate of 1 ml/min using the following solvent program:

| Time (min) | % Water | % Acetone | % Acetonitrile |
|---|---|---|---|
| 0 | 30 | 70 | 0 |
| 22 | 20 | 80 | 0 |
| 26 | 20 | 80 | 0 |
| 41 | 0 | 80 | 20 |
| 81 | 0 | 50 | 50 |
| 82 | 30 | 70 | 0 |

Components are identified by mass spectrometry and quantified using relative response factors.

3. Gas Chromatography (GC) Characterization

The ester composition of a PGE sample can also be analyzed by GC analysis. Typically, GC characterization is more suited for analyzing unesterified polyglycerols and lower molecular weight polyglycerol esters. Samples are prepared as trimethylsilyl (TMS) derivatives and analyzed by high temperature capillary GC configured for split injection and flame ionization detection. For each sample, a drop of melted sample is added to a 2-mL vial to which 0.5 mL each of pyridine and 5:1 TMSI:BSTFA (N-trimethylsilylimidazole:(N,O)-bis trimethylsilyltrifluroacetamide) are added. Vials were capped, shaken, and heated to 90–100° C. for 15 minutes. Separations are performed on a Chrompak CP-Sil 5CB fused-silica column (2-m×0.25 mm, 0.12-mm film). Chromatographic conditions are as follows: injection volume, 1 mL; carrier and detector make-up gas, helium; split ratio 70:1; carrier gas linear velocity, 45 cm/sec with constant flow programming; injector temperature, 340° C.; detector temperature 350° C.; oven temperature, 110° C. (2 min.), then 25° C./min to 350° C. (8 min.). Individual components are identified by mass spectrometry. Eluting components are identified based upon mass spectrometry data and quantified by area normalization following correction of areas for relative response differences of the components.

4. Aqueous Dispersion Characterization

Materials:
Polarized Light Microscope with 10× to 40× objectives (Nikon Microphot or equivalent)
Hot Stage and Controller (Mettler FP-80 Central Processor, FP-82 Hot Stage or equivalents)
High Resolution Camera (MTI CCD 72 or equivalent)
Image Acquisition Software (Optimas v6.2 or equivalent)
Microscope Slide and Cover Glass
Emulsifier system to be characterized
500 mL beaker
Mixing device (e.g. propeller mixer or magnetic stir bar)
Pipette
Hot Plate

*Note: Camera and Software are optional equipment for recording purposes.

Procedure:
Prepare a 10% emulsifier dispersion by adding 20 g of the emulsifier system to 180 g of distilled water in 500 mL beaker. Heat to approximately 60° C. Mix until a milky dispersion is formed. Use the hot plate to maintain the dispersion at a temperature of about 45° C.

Place a drop of the dispersion on a pre-warmed slide (warmed on the hot plate to about 45° C.) and cover with a cover slip.

Place the glass slide with cover slip in hot stage (maintained at 45° C.). Place the hot stage on the microscope stage. Program the hot stage to heat from 45° C. to 80° C. at a controlled rate, e.g. 5° C./minute, followed by a temperature hold at 80° C. for 5 minutes. Insert the polarizing filter into the microscope. Adjust light intensity and camera acquisition controls for optimum resolution. Run the program on the hot stage controller.

Figure 1A:
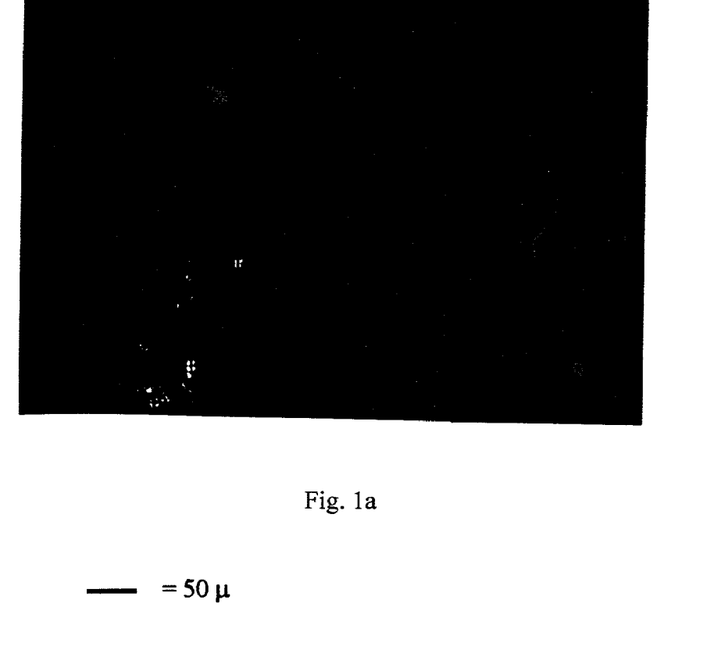
FIG. 1a is a photomicrograph of a stable 10% aqueous dispersion of a di-triglycerol monopalmitate at 45° C.
Figure 1B:
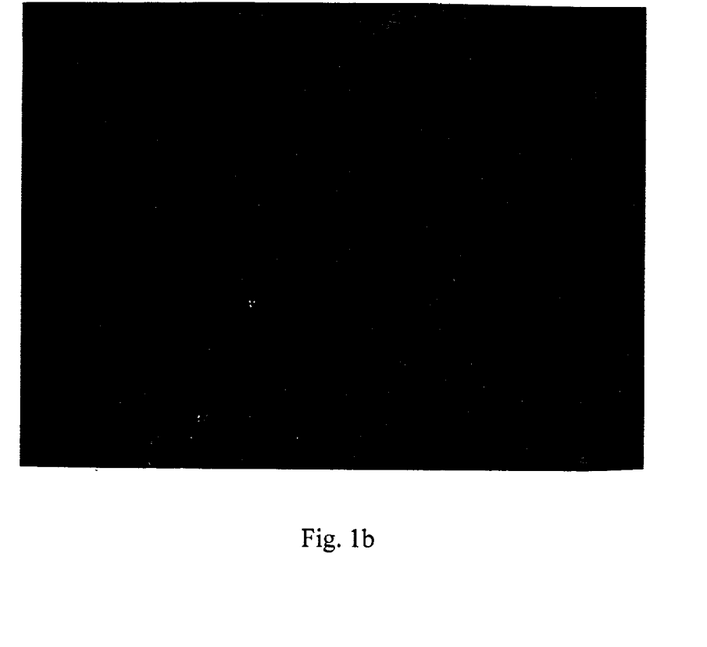
FIG. 1b is a photomicrograph of a stable 10% aqueous dispersion of the same di-triglycerol monopalmitate after being held at 80° C. for 5 minutes.
Figure 2A:
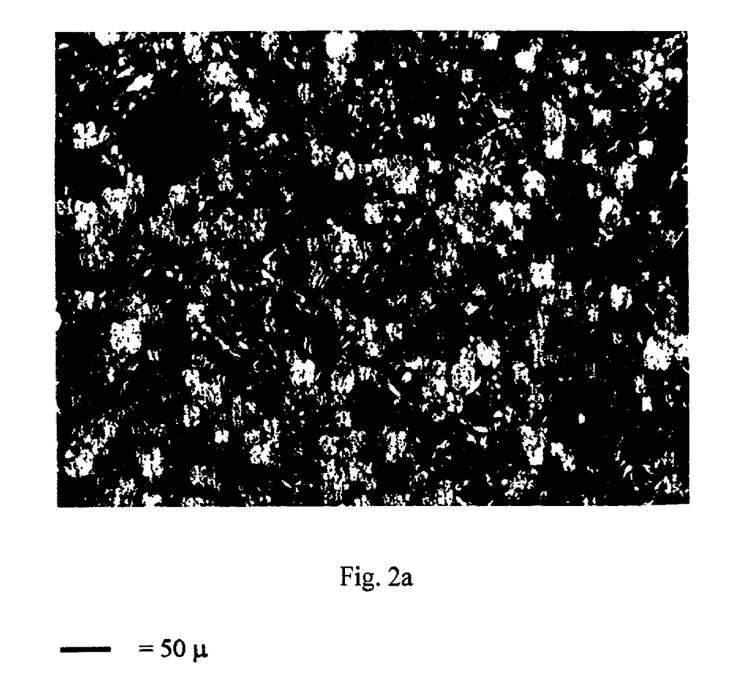
FIG. 2a is a photomicrograph of a stable 10% aqueous dispersion of monoglyceride (i.e., about 50% monopalmitate and about 50% monostearate) at 45° C.
Figure 2B:
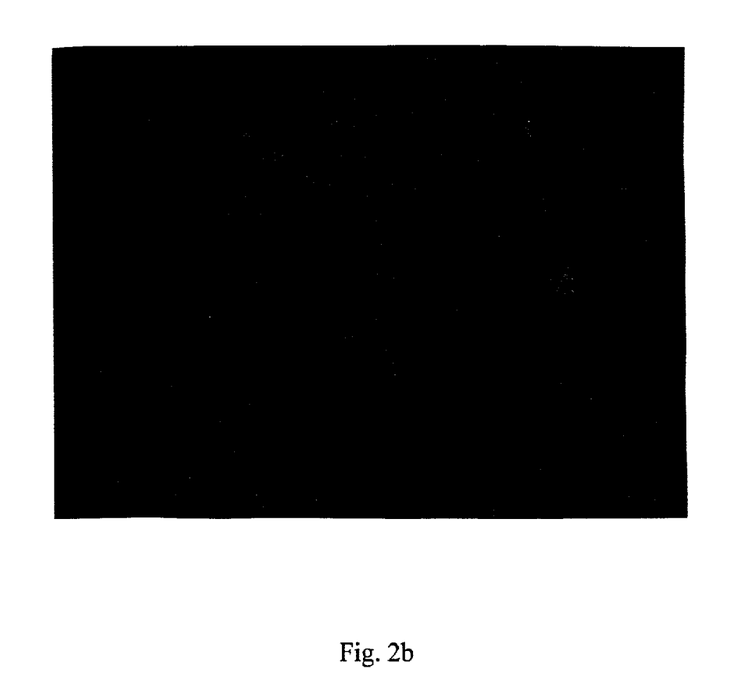
FIG. 2b is a photomicrograph of the above monoglyceride sample after being held at 80° C. for 5 minutes. The loss of birefringence clearly shows that the dispersion is lost at the elevated temperature.

At the end of the program, observe the morphology of the dispersion. To determine if the emulsifier system exists as a stable dispersion, look for characteristics of the dispersed phase. The dispersed phase is characterized by birefringent bands of lamellar liquid crystal and/or aggregates with internal lamellar structure characterized by birefringent extinction crosses or mosaic texture. (See FIGS. 1a, 1b and 2a.) The cubic plus water and fluid isotropic phases (both less functional phases) do not exhibit birefringence under polarized light. (See FIG. 2b.) If the birefringence of the dispersion aggregates has been extinguished, the emulsifier system in question does not exist as a stable dispersion at 80° C. The morphologies of liquid crystalline phases have been described in the literature. See F. B. Rosevear, *J. Soc. Cosmetic Chemists*, 19, 581–594 (Aug. 19, 1968) and N. Krog in *Food Emulsions*, ed. Stig E. Friberg and Kåre Larsson, 1997, Marcel Dekker, New York.

VI. EXAMPLES

The following examples illustrate the improved emulsifier systems, dehydrated ingredients and various food of the present invention. The examples are given solely for the purpose of illustration, and are not to be construed as limitations of the present invention since many variations thereof are possible without departing from its spirit and scope.

A. Dehydration Examples

Example 1

An improved emulsifier system suitable for use in the manufacture of potato flakes (and other ingredients) consisting of a PGE sample has the following composition:

| Ester Composition | |
|---|---|
| 85% | Diglycerol Monoester |
| 2% | Triglycerol Monoester |
| 2% | Free Polyol |
| 11% | Other PGEs, including Diglycerol Diesters and Diglycerol Triesters |

| Fatty Acid Composition | |
|---|---|
| 97% | Palmitic Acid |
| 2% | Stearic Acid |
| 1% | Other fatty acids |

Example 2

An improved emulsifier system suitable for use in the manufacture of potato flakes (or other dehydrated ingredients) consisting of a PGE sample has the following composition:

| Ester Composition | |
|---|---|
| 77% | Diglycerol Monoester |
| 4% | Triglycerol Monoester |
| 8% | Free Polyol |
| 11% | Other PGEs, including Diglycerol Diesters and Diglycerol Triesters |
| Fatty Acid Composition | |
| 98% | Palmitic Acid |
| 2% | Stearic Acid |

Example 3

An improved emulsifier system suitable for use in the manufacture of potato flakes (and other dehydrated ingredients) consists of monoglyceride and a PGE sample having the following composition:

| | |
|---|---|
| 70% | PGE composition of Example 1 |
| 30% | Monoglyceride |
| Composition of Monoglyceride | |
| 92% | Monoglyceride |
| 4% | Diglyceride |
| 1% | Triglyceride |

| Fatty Acid Composition | |
|---|---|
| 49% | Palmitic Acid |
| 48% | Stearic Acid |
| 1% | Oleic Acid |
| 2% | Other fatty acids |

Example 4

An improved emulsifier system suitable for use in the manufacture of potato flakes (or other dehydrated ingredients) consists of Panodan™ 205, a commercially available DATEM made by Danisco Cultor (New Century, Kans.). It has the following fatty acid composition:

| | |
|---|---|
| 11% | Palmitic acid |
| 87% | Stearic acid |
| 1% | Oleic acid |
| 1% | Other fatty acid |

Examples 5–7

A mixture of 66% Russet Burbank and 34% Norkota potatoes having an overall solids level of about 20% and reducing sugars of about 1.6% are washed in room temperature water to remove dirt and any foreign materials. The potatoes are then steam-peeled and cut into 0.625 in. (1.59 cm) thick slices. The slices are then cooked for 30 minutes at a steam pressure of 38–40 psig. The cooked potato slices are then shredded and mashed as they are forced through a die plate. Emulsifier is added to the potato mash in the form of a 5% aqueous dispersion as outlined in the table below. The potato mash is mixed with the dispersion as it is fed through an augur and distributed to two single drum dryers. The potato mash is spread onto the drying drum with four applicator rolls, forming a thin sheet layer of 0.005–0.008 in. (0.013 to 0.020 cm). The drum is rotated at approximately 14–16 s/rev. This results in a dehydrated potato sheet having a moisture content of 7–8%, which is removed from the drum by a doctor knife. The properties of the finished potato flakes are also outlined in the table below.

| Properties | Example 5 | Example 6 | Example 7 |
|---|---|---|---|
| Emulsifier added | PGE of Ex. 1) | PGE (Ex. 2) | DATEM (Ex. 4)* |
| Emulsifier concentration (% in finished dehydrated flakes) | 0.1 | 0.1 | 0.1 |
| Production Rate (lb/hr) | 1600–1800 | 1900 | 1700–1900 |
| Water Absorption Index (WAI)** | 9.9 | 8.9 | 8.8 |
| Peak Viscosity (cps) | 220 | 188 | 171 |
| Final Viscosity (cps) | 107 | 124 | 92 |
| Percent Free Amylose** | 26.8 | 23.1 | 24.1 |

*In order to make an aqueous dispersion wherein the DATEM is most functional, the pH of the dispersion is increased to pH 5–7 using sodium hydroxide. This can be added directly to the water used to make the dispersion or added as a solution.
**WAI and Percent Free Amylose are measured according to the procedures described in the Analytical Methods section of U.S. Pat. No. 6,066,353, issued to Villagran et al.

Examples 8–14

The following emulsifier systems are used to produce dehydrated potato ingredients in the manner described in Examples 5 through 7:

| Example No.  | 8   | 9   | 10  | 11  | 12  | 13  | 14  |
|---|---|---|---|---|---|---|---|
| PGE-1        | 0%  | 0%  | 0%  | 0%  | 0%  | 0%  | 80% |
| PGE-2        | 50% | 50% | 90% | 50% | 0%  | 95% | 0%  |
| DATEM*       | 0%  | 50% | 0%  | 0%  | 90% | 0%  | 15% |
| Monoglyceride| 50% | 0%  | 0%  | 40% | 0%  | 0%  | 0%  |
| Lecithin     | 0%  | 0%  | 10% | 10% | 10% | 5%  | 5%  |

*: The DATEM dispersion pH can be adjusted to optimize performance.
PGE-1: PGE described in Example 1.
PGE-2: PGE described in Example 2.
DATEM: As described in Example 7.
Monoglyceride: Dimodan ® PVP as described in Example 3.
Lecithin: UltraLec ® F is a deoiled, ultrafiltered soybean lecithin available from ADM, Decatur, IL.

Example 15

A mashed potato is made with the following composition:

| 45 g  | Flakes made according to Example 5 |
| 169 g | Water |
| 12 g  | Margarine (60% fat) |
| 1 g   | Salt |
| 77 g  | Milk (Whole) |

Water, margarine & salt are heated to boiling. Milk and flakes are then added and the combination is mixed well. The finished mashed potato is comparable to current commercial mashed potato products.

B. Dough and Finished Product Examples

Example A

A dough composition is prepared using the potato flakes prepared in Example 6. The dough composition comprises 35% water, 3% dough emulsifier*, and 62% of the following mixture of ingredients:

| Ingredient | Wt. % in mixt. |
|---|---|
| Potato flakes of Example 6 | 60 |
| Potato flanules (XL-Potato Granules from Basic American Foods, Plover, WI) | 13 |
| Corn Meal (PCPF400 ™ Lauhoff Corn Milling Co., St. Louis, MO) | 12 |
| Wheat starch (Aytex P ™, ADM, Decatur, IL) | 8 |
| Maltodextrin (DE 18 from Grain Processing, IA) | 7 |

*The dough emulsifier used in the preparation of the dough is Aldo® MO, which is available from Lonza Group, Fairlawn, N.J. Aldo® MO is a blend of monoglycerides, diglycerides, and triglycerides with the following composition:

| Fatty acid composition | | Ester composition | |
|---|---|---|---|
| 64% | Oleic acid    | 59% | Monoglyceride |
| 19% | Linoleic acid | 35% | Diglyceride |
| 7%  | Linolenic acid| 4%  | Triglyceride |
| 4%  | Palmitic acid | 2%  | Other species |
| 2%  | Stearic acid  |     | |
| 4%  | Other fatty acid |  | |

The potato flakes, potato flanules, corn meal, wheat starch, and maltodextrin are mixed together in a blender. (Alternatively, the maltodextrin may be dissolved in the water before being added to the dough.) The emulsifier is heated to produce a homogeneous liquid. Using a dough mixer the emulsifier is added to the dry mixture followed by water (or water plus maltodextrin) to form a loose, dry dough. The dough is sheeted by continuously feeding it through a pair of sheeting rolls, forming an elastic continuous sheet without pinholes. Sheet thickness is controlled to about 0.02 in. (0.051 cm). The dough sheet is then cut into oval shaped pieces and fried in a constrained frying mold at 375° F. (191° C.) for about 6 seconds to make a finished product. The frying oil is NuSun™ oil. NuSun™ oil is a mid-oleic sunflower oil that is commercially available from ADM (Decatur, Ill.).

Example B

A dough composition is prepared as in Example A, wherein the dough emulsifier is a di-triglycerol monoester. This dough PGE, referred to as 2,3-1-O, is a developmental sample from Lonza Group (Fairlawn, N.J.). This PGE (2,3-1-O) has the following composition:

| Fatty acid composition | | Ester Composition | |
|---|---|---|---|
| 90% | Oleic acid    | 53% | Diglycerol monoester |
| 6%  | Linoleic acid | 4%  | Triglycerol monoester |
| 3%  | Stearic acid  | 10% | Diglycerol diesters |
| 1%  | Palmitic acid | 3%  | Triglycerol diesters |
|     |               | 23% | Free Polyol |
|     |               | 7%  | Other esters |

Example C

A dough composition is prepared as in Example A, except the flakes are those prepared in Example 5 and the dough emulsifier blend consists of the following ingredients:

| Ingredient | Wt. % in mixture |
|---|---|
| Aldo ® MO | 70 |
| NuSun ™ oil | 30 |

NuSun™ oil is a mid-oleic sunflower oil that is commercially available from ADM (Decatur, Ill.).

Example D

A dough composition is prepared as in Example A, except the dough emulsifier blend consists of the following ingredients:

| Ingredient | Wt. % in mixture |
|---|---|
| Aldo ® MO | 40 |
| NuSun ™ oil | 40 |
| PGE (2,3-1-O) | 20 |

Example E

A dough composition is prepared as in Example A, except the flakes are those prepared in Example 5 and the dough emulsifier blend consists of the following ingredients:

| Ingredient | Wt. % in mixture |
| --- | --- |
| Aldo ® MO | 50 |
| NuSun ™ oil | 30 |
| PGE (Mazol ® PGO 31K) | 20 |

Mazol® PGO 31K is a polyglycerol ester sample that is available from BASF Corporation (Mount Olive, N.J.) and has the following composition:

| Fatty acid composition | | Ester Composition | |
| --- | --- | --- | --- |
| 90% | oleic acid | 10% | Diglycerol monoester |
| 6% | linoleic acid | 5% | Triglycerol monoester |
| 3% | stearic acid | 17% | Diglycerol diesters |
| 1% | palmitic acid | 10% | Triglycerol diesters |
| | | 10% | Free polyol |
| | | 23% | Other esters |
| | | 10% | Monoglyceride |
| | | 15% | Diglyceride |

Example F

A dough composition is prepared as in Example A, except the flakes are those prepared in Example 11 and the dough emulsifier blend consists of the following ingredients:

| Ingredient | Wt. % in mixture |
| --- | --- |
| Aldo ® MO | 60 |
| NuSun ™ oil | 35 |
| UltraLec ® F | 5 |

UltraLec® F is a deoiled, ultrafiltered soybean lecithin that is commercially available from ADM (Decatur, Ill.).

Example G

A dough composition is prepared as in Example A, except the flakes are those prepared in Example 14 and the dough emulsifier blend consists of the following ingredients:

| Ingredient | Wt. % in mixture |
| --- | --- |
| Aldo ® MO | 40 |
| NuSun ™ oil | 35 |
| PGE (2,3-1-O) | 20 |
| UltraLec ® F | 5 |

Example H

A dough composition is prepared as in Example A, except the dough emulsifier consists of the following ingredients:

| Ingredient | Wt. % in mixture |
| --- | --- |
| PGE (2,3-1-O) | 50 |
| NuSun ™ oil | 50 |

Example I

A dough composition is prepared as in Example A, except the flakes are those prepared in Example 8 and the dough emulsifier blend consists of the following ingredients:

| Ingredient | Wt. % in mixture |
| --- | --- |
| PGE (2,3-1-O) | 50 |
| NuSun ™ oil | 45 |
| UltraLec ® F | 5 |

Example J

A dough composition is prepared as in Example A, except the flakes are those prepared in Example 9 and the dough emulsifier is Panodan™ SD, a DATEM available from Danisco Cultor, New Century, Kans. and having the following composition:

| Fatty acid composition | |
| --- | --- |
| 64% | linoleic acid |
| 20% | oleic acid |
| 7% | stearic acid |
| 7% | palmitic acid |
| 2% | other fatty acid |

Example K

A dough composition is prepared as in Example A, except the flakes are those prepared in Example 13 and the dough emulsifier blend consists of the following ingredients:

| Ingredient | Wt. % in mixture |
| --- | --- |
| Panodan ™ SD | 50 |
| NuSun ™ oil | 50 |

Example L

A dough composition is prepared as in Example A, except the flakes are those prepared in Example 12 and the dough emulsifier blend consists of the following ingredients:

| Ingredient | Wt. % in mixture |
| --- | --- |
| Panodan ™ SD | 50 |
| PGE (2,3-1-O) | 50 |

Example M

A dough composition is prepared as in Example A, except the flakes are those prepared in Example 10 and the dough emulsifier blend consists of the following ingredients:

| Ingredient | Wt. % in mixture |
| --- | --- |
| UltraLec ® F | 20 |
| NuSun ™ oil | 80 |

Examples N and O

The following dough emulsifier blends are used to prepare fat-free fabricated chips.

| Ingredient* | Example N | Example O |
|---|---|---|
| PGE (2,3-1,2-IM) | 17.5% | 35% |
| Lecithin (UltraLec ® P) | 17.5% | 0% |
| Olean ® | 65% | 65% |

*Olean ® is available from the Procter and Gamble Company, Cincinnati, Ohio. The lecithin component is a commercial lecithin, UltraLec ® P, available from ADM, Decatur, IL. The PGE, a mixture of di- and triglycerol mono- and diesters of IM fatty acids, is a developmental sample from Lonza Group, Fairlawn, NJ. This PGE has the following composition:

| Fatty acid composition | Ester Composition |
|---|---|
| 73% oleic acid | 26% diglycerol monoester |
| 14% palmitic acid | 23% diglycerol diester |
| 8% stearic acid | 12% triglycerol monoester |
| 5% linoleic acid | 7% triglycerol diester |
| | 6% tetraglycerol monoester |
| | 6% tetraglycerol diester |
| | 7% free polyol |
| | 13% other PGEs |

Dough compositions are prepared using the potato flakes prepared in Example 5. Each dough composition comprises 35% water, 3% dough emulsifier, and 62% of the following mixture of ingredients:

| Ingredient | Wt. % in mixture |
|---|---|
| Potato flakes | 74 |
| Potato flanules (XL-granules Basic American Foods, Plover, WI) | 10 |
| Precooked Waxy Corn Starch (Ultrasperse ®-A) from National Starch & Chemical Corp., Bridgewater, NJ) | 8 |
| Substituted Waxy Maize (N-Creame ™46 from National Starch & Chemical Corp.) | 1 |
| Maltodextrin (DE 18 from Grain Processing, IA) | 7 |

The potato flakes, potato flanules, modified starches, and maltodextrin are mixed together in a blender. (Alternatively, the maltodextrin may be dissolved in the water before being added to the dough.) The emulsifier is heated to produce a homogeneous liquid. Using a dough mixer the emulsifier is added to the dry mixture followed by water (or water plus maltodextrin) to form a loose, dry dough. The dough is sheeted by continuously feeding it through a pair of sheeting rolls, forming an elastic continuous sheet without pinholes. Sheet thickness is controlled to about 0.02 in. (0.051 cm). The dough sheet is then cut into oval shaped pieces and fried in a constrained frying mold in Olean® at 375° F. (191° C.) for about 6 seconds to make a finished product.

Example P

A dough composition is prepared as in Example A, wherein the dough emulsifier is a 50:50 mixture of triglyceride oil (NuSun™ oil, described above) and 2-1-O, DGME available from Danisco Cultor and having the following composition:

| Fatty acid composition | Ester Composition |
|---|---|
| 90% Oleic acid | 79% Diglycerol monoester |
| 6% Linoleic acid | 2% Triglycerol monoester |
| 3% Stearic acid | 3% Diglycerol diesters |
| 1% Palmitic acid | 1% Triglycerol diesters |
| | 14% Free Polyol |
| | 1% Other esters |

INCORPORATION BY REFERENCE

All of the aforementioned patents, publications, and other references are herein incorporated by reference in their entirety.

What is claimed is:

1. An emulsifier system comprising monoglyceride, lecithin and from 70 to 99%, by weight, of a polyglycerol ester having a polyglycerol backbone of from 2 to about 10 glycerol units wherein not more than about 40% of the hydroxyl groups of the polyglycerol are esterified with fatty acids (hereafter "PGE") and wherein the fatty acids are selected from the group consisting of oleic acid, palmitic acid, stearic acid, intermediate melting fatty acids, and mixtures thereof.

2. An emulsifier system of claim 1 wherein at least about 80% of the PGEs, by weight, have a polyglycerol backbone of from 2 to about 5 glycerol units.

3. An emulsifier system of claim 1 wherein at least about 80% of the PGEs, by weight, have a polyglycerol backbone of 2 or 3 glycerol units.

4. An emulsifier system of claim 1 wherein from about 20% to about 35% of the hydroxyl groups of the polyglyerol are esterified with fatty acids.

5. An emulsifier system of claim 1 comprising PGEs wherein at least about 80% of the ester groups are derived from saturated fatty acids.

6. An emulsifier system of claim 1 wherein the emulsifier system contains not more than about 15% free polyglycerol.

7. An emulsifier system of claim 1 comprising a material selected from the group consisting of 2-1-P, 2-1-S, 3-1-P, 3-1-S, 4-1-P, 4-1-S, and mixtures thereof.

8. An emulsifier system of claim 1 comprising polyglycerol monoesters having a polyglycerol backbone of from 2 to about 10 glycerol units, wherein at least about 40%, by weight, of the polyglycerol monoesters are diglycerol monoesters.

9. An emulsifier system of claim 8 wherein at least about 75%, by weight, of the polyglycerol monoesters are comprised of one or more of 2-1-S, 2-1-P and 2-1-IM.

10. An emulsifier system of claim 1 comprising polyglycerol monoesters having a polyglycerol backbone of from 2 to about 10 glycerol units, wherein at least about 40%, by weight, of the polyglycerol monoesters are di-triglycerol monoesters.

11. An emulsifier system of claim 10, wherein at least about 75%, by weight, of the polyglycerol monoesters are di-triglycerol monoesters.

* * * * *